(12) United States Patent
Kollmer et al.

(10) Patent No.: US 9,517,739 B2
(45) Date of Patent: Dec. 13, 2016

(54) DIAGNOSE ARRANGEMENT FOR A VEHICLE PEDESTRIAN IMPACT SENSOR

(75) Inventors: Norbert Kollmer, Ismaning (DE); Richard Baur, Bergheim (DE); Herbert Hoefelsauer, Munich (DE)

(73) Assignees: AUTOLIV DEVELOPMENT AB, Vargarda (SE); BAYERISCHE MOTOREN WERKE AKTIENGESELLSCHAFT, Munich (DE)

( * ) Notice: Subject to any disclaimer, the term of this patent is extended or adjusted under 35 U.S.C. 154(b) by 271 days.

(21) Appl. No.: 14/364,071

(22) PCT Filed: Dec. 9, 2011

(86) PCT No.: PCT/SE2011/051494
§ 371 (c)(1),
(2), (4) Date: Aug. 20, 2014

(87) PCT Pub. No.: WO2013/085444
PCT Pub. Date: Jun. 13, 2013

(65) Prior Publication Data
US 2015/0033826 A1 Feb. 5, 2015

(51) Int. Cl.
*G01L 27/00* (2006.01)
*B60R 19/48* (2006.01)
(Continued)

(52) U.S. Cl.
CPC .............. *B60R 19/48* (2013.01); *B60R 19/483* (2013.01); *B60R 21/0136* (2013.01);
(Continued)

(58) Field of Classification Search
CPC ....... G01M 3/26; G01M 3/2815; G01L 27/00; G01L 27/007; G01L 2019/0053; G01L 19/0092; G01L 19/143; G01L 19/147; G01L 9/0089; G01L 7/16; G01L 7/163; G01L 5/0052; B60R 19/483
(Continued)

(56) References Cited

U.S. PATENT DOCUMENTS 3,810,668 A * 5/1974 Kornhauser ...... B60R 21/26005
267/116
7,828,350 B2 11/2010 Kiribayashi
(Continued)

FOREIGN PATENT DOCUMENTS

| DE | 10 2010 002 139 A1 | 8/2011 |
| EP | 2 256 007 A1 | 12/2010 |
| WO | 2007/067121 A1 | 6/2007 |

*Primary Examiner* — Benjamin Schmitt
(74) *Attorney, Agent, or Firm* — McDermott Will & Emery LLP

(57) ABSTRACT

The present invention relates to a vehicle impact sensor device adapted to detect an impact between a vehicle (1) and a person. The sensor device (6) comprises a tubular enclosure (7) which encloses a gas-filled space (8). The tubular enclosure (7) has a first end (7a) and a second end (7b) and is arranged to extend along a bumper cover (5), when mounted to a vehicle (1). The sensor device (6) further comprises a pressure sensor (9, 9', 11, 11') arranged to detect pressure characteristics in the the tubular enclosure (7). The sensor device (6) also comprises a gas pulse device (11, 11') which is connected to the tubular enclosure (7), the gas pulse device (11, 11') being arranged to insert gas into, or withdraw gas from, the tubular enclosure (7).

13 Claims, 3 Drawing Sheets

(51) Int. Cl.
*G01M 3/28* (2006.01)
*B60R 21/0136* (2006.01)
*G01M 3/26* (2006.01)
*G01L 5/00* (2006.01)
*G01L 7/16* (2006.01)

(52) U.S. Cl.
CPC ............ *G01L 27/007* (2013.01); *G01M 3/26* (2013.01); *G01M 3/2815* (2013.01); *G01L 5/0052* (2013.01); *G01L 7/16* (2013.01)

(58) Field of Classification Search
USPC ... 73/1.37, 1.57, 1.68, 1.71, 31.04, 502, 744
See application file for complete search history.

(56) References Cited

U.S. PATENT DOCUMENTS

2004/0020701 A1* 2/2004 Aoki .................. B60R 21/0136
 180/274
2009/0021029 A1 1/2009 Kiribayashi

* cited by examiner

Section A-A

DIAGNOSE ARRANGEMENT FOR A VEHICLE PEDESTRIAN IMPACT SENSOR

DESCRIPTION OF THE INVENTION

The present invention relates to a vehicle impact sensor device adapted to detect an impact between a vehicle and a pedestrian. The sensor device comprises a tubular enclosure which encloses a gas-filled space. The tubular enclosure 7 has a first end 7a and a second end 7b and is arranged to extend along a bumper cover 5, mainly across a vehicle forward direction of movement D, when mounted to a vehicle. The sensor device further comprises at least one pressure sensor arranged to detect pressure characteristics in the the tubular enclosure.

The present invention relates to a gas pulse device arranged to insert gas into, or withdraw gas from, a tubular enclosure.

Vehicle manufacturers are faced with the task of providing pedestrian protection, such that pedestrians who are hit by a vehicle in the event of an accident suffer as little injuries as possible. It has been observed that if a motor vehicle hits a pedestrian, the bumper of the vehicle often hits the legs or lower torso of the pedestrian. Hence, the legs of the pedestrian will normally be pushed in the travel direction of the vehicle, and the head and upper torso will normally be tilted towards the hood and windscreen of the vehicle. This tilting movement often causes the head or upper torso of the pedestrian to first make contact with the hood and thereafter, if the impact force from the hit is strong enough and the vehicle continues forward, also reach the windscreen.

The engine hood has been suited to absorb the collision force acting on a pedestrian, but due to a quite small clearance distance between the mostly very hard engine compartment equipment and the hood, the deformation path of the hood is limited. This means that a pedestrian that is hit by a vehicle and who strikes the hood, probably will be injured by the underlying cylinder head or some other heavy, non-resilient structure under the hood.

In order to counteract this, vehicle hoods have been developed such that, in the event of a frontal accident involving a pedestrian, they are moved from a normal position to a raised position. The hood is then raised approximately 10 cm to 15 cm, normally at the rear end of the hood, such that the hood in its raised position has an inclination that decreases from the vehicle windscreen towards the front of the vehicle. This inclination also serves to guide the pedestrian towards the windscreen, which has been found to provide good absorption of collision forces. Hood lifting arrangements are for example disclosed in WO 2007/067 121 and EP 2 256 007.

In order to achieve such a raising of the engine hood, it is necessary to provide sensors that quickly and reliably detect a pedestrian and a fast-acting hood raising, normally driven by a pyrotechnical charge.

Sensors that have been used previously have for example been based on pressure change in an enclosed space behind a front bumper of a vehicle, as described in U.S. Pat. No. 7,828,350. Here, it is described how defects in the sensor are detected, for example if the enclosed space has lost its air-tight capabilities. Such defect detection is described to be performed by means of vibration of the enclosed space and its enclosure using for example a piezoelectric element. The enclosed space may also be affected by means of ultrasonic waves or a heating element in order to detect defects.

However, all these prior techniques suffer from disadvantages due to sensitivity for disturbances such as noise and system time lag.

It is therefore the object of the present invention to provide a diagnose arrangement for a vehicle pedestrian impact sensor that provides a quick and reliable diagnose check of said sensor.

This object is achieved by means of a vehicle impact sensor device adapted to detect an impact between a vehicle and a pedestrian. The sensor device comprises a tubular enclosure which encloses a gas-filled space. The tubular enclosure 7 has a first end 7a and a second end 7b and is arranged to extend along a bumper cover 5, mainly across a vehicle forward direction of movement D, when mounted to a vehicle. The sensor device further comprises a pressure sensor arranged to detect pressure characteristics in the the tubular enclosure. The sensor device also comprises a gas pulse device which is connected to the tubular enclosure, the gas pulse device being arranged to insert gas into, or withdraw gas from, the tubular enclosure.

According to an example, the gas pulse device comprises a main enclosure and a transitional enclosure, where the transitional enclosure connects the gas pulse device to the tubular enclosure.

According to another example, the main enclosure comprises a membrane dividing the main enclosure in a first part and a second part. The first part is connected to the tubular enclosure and the second part is sealed from the tubular enclosure by means of the membrane.

According to another example, the gas pulse device comprises a piston which has a longitudinal extension and is drivable from a rest position in a direction along its longitudinal extension such that a gas pulse is created. The piston may for example be driven by an electromagnet device or by a piezoelectric device (19). In the latter case, the piston is in the form of a piezoelectric stack.

According to another example, a control unit is connected to said pressure sensor and is arranged to determine whether the resulting input from said pressure sensor falls within an expected pressure sensor input range following an insertion or withdrawal of gas by means of the gas pulse device.

According to another example, the gas pulse device is arranged to function as a pressure sensor.

This object is also achieved by means of a gas pulse device according to the above.

The term pedestrian should in a more general form be constituted by a person, since a person that may be hit by a vehicle may not only walk, but also for example travel with a bicycle.

Other examples and details are disclosed in the dependent claims.

A number of advantages are provided by means of the present invention. Mainly, a quick and reliable diagnose check of a vehicle pedestrian impact sensor is acquired.

BRIEF DESCRIPTION OF THE DRAWINGS

The present invention will now be described more in detail with reference to the appended drawings, where.

DETAILED DESCRIPTION

Figure 1:
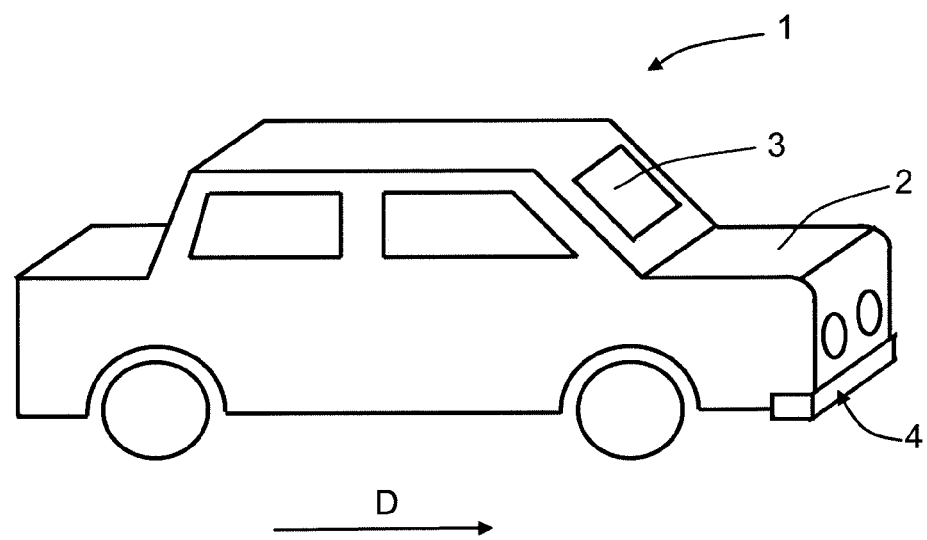
FIG. 1 shows a schematic side view of a vehicle before activation of a hood lifting actuator.
Figure 2:
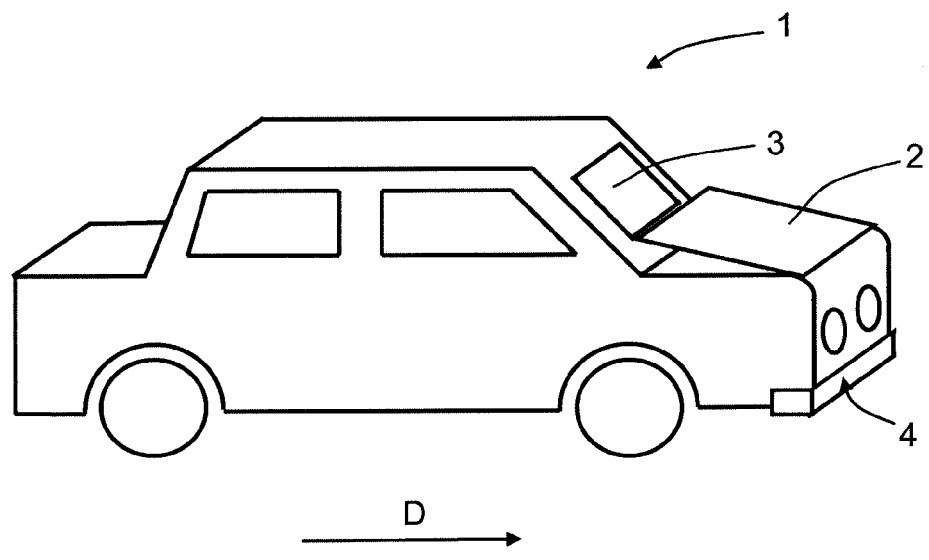
FIG. 2 shows a schematic side view of a vehicle after activation of a hood lifting actuator.

FIG. 1 shows a vehicle 1 with a hood 2 and a windscreen 3 in a normal condition. The vehicle 1 has a forward direction of movement that is indicated with an arrow D. In the event of a collision with a pedestrian (not shown), the rear part of the hood 2, i.e. the part closest to the windscreen, is raised as shown in FIG. 2. The vehicle comprises a front bumper 4, arranged at the lower front of the vehicle 1.

Figure 3:
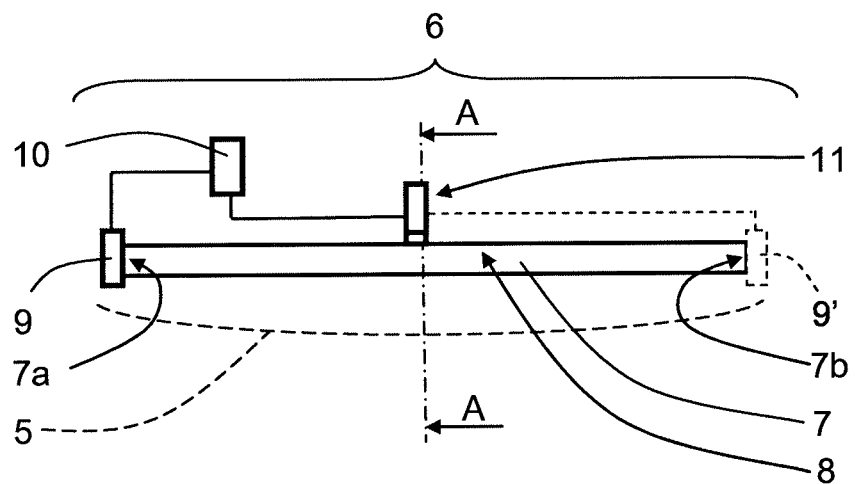
FIG. 3 shows a schematic top view of a sensor device according to the present invention.

With reference to FIG. 3, the bumper 4 comprises a bumper cover 5, which in turn may comprise an absorbing material such as foam. Behind the bumper cover 5, a sensor device 6 is arranged. The sensor device 6 comprises a tubular enclosure 7 which encloses a space 8 filled with a gas such as air, the tubular enclosure 7 having a first end 7a and a second end 7b. The tubular enclosure 7 mainly extends along the bumper cover 5, mainly across the forward direction of movement D. The tubular enclosure 7 has a rectangular cross-section, and is formed such that it is air-tight and deformable. Preferably the gas filling the space 8 is under over-pressure.

The sensor device 6 further comprises a pressure sensor 9 positioned at the first end 7a, arranged to detect the gas pressure in the tubular enclosure 7.

The bumper cover 5 is displaceable and deformable towards the sensor device 6 such that the bumper cover 5 is pressed against the sensor device 6 in the event of an impact with a pedestrian.

In the event of a collision with a pedestrian, the gas pressure in the tubular enclosure 7 changes, which is detected by the pressure sensor 9, which pressure sensor 9 in turn is connected to a control unit 10. The control unit 10 receives data from the pressure sensor 9 and uses the data for determining that a pedestrian accident has occurred. The determined information is used at the next step, where the control unit 10 activates protective devices such as a hood lifter and windscreen airbags (not shown).

The functionality above relies on the fact that the volume of the space 8 is changed, possibly decreased, such that the gas pressure in the tubular enclosure 7 is increased. If there is a uncontrolled leakage in the tubular enclosure 7, the change of gas pressure at a collision with a pedestrian might not be regarded to correspond to such a collision, and the protective devices will not be activated. It is therefore of the essence for the pedestrian protection that there are no such leakage or other malfunction in the sensor device 6. Another example of a malfunction in the sensor device 6 may be a broken pressure sensor 9.

Figure 4:
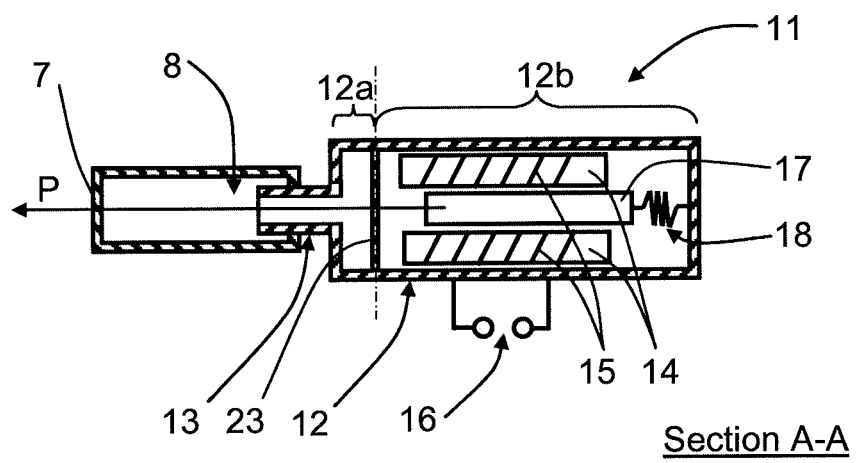
FIG. 4 shows a schematic cross-section view of a first example of a gas pulse device according to the present invention.

According to the present invention, the sensor device 6 comprises a gas pulse device 11, which is connected to the tubular enclosure 7. With reference to FIG. 4, the gas pulse device 11 comprises a main enclosure 12 and a transitional enclosure 13, where the transitional enclosure 13 connects the main enclosure 12 to the tubular enclosure 7 in an air-tight manner, and is in FIG. 4 shown to extend into the tubular enclosure 7.

The main enclosure 12 comprises a membrane 23, dividing the main enclosure 12 in a first part 12a and a second part 12b, where the first part 12a is open into the tubular enclosure 7, and where the second part 12b is sealed from the tubular enclosure 7 by means of the membrane 23.

The second part 12b comprises an electromagnet device 14 with electrical windings 15, the electrical windings being connected to a power source 16; this is only schematically indicated in FIG. 4. The second part 12b further comprises a piston 17 which is drivable from a rest position in a direction P towards the membrane 23 by means of the electromagnet device 14 such that a gas pulse is created in the space 8 in the tubular enclosure 7. The control unit 10, being in control of the power source 16 and thus the electromagnet device 14, is arranged to compare the resulting input from the pressure sensor 9 with an expected input range following such a pulse. If the input does not fall within the range, it is determined that the sensor device is not functioning, and an error message is displayed at the dashboard of the vehicle. In this way, a diagnosis check may be performed for the sensor device 6. The piston 17 is held in the rest position by means of a spring 18.

By means of the gas pulse device 11, a quick and reliable diagnose of the sensor device 6 is acquired.

Figure 5:
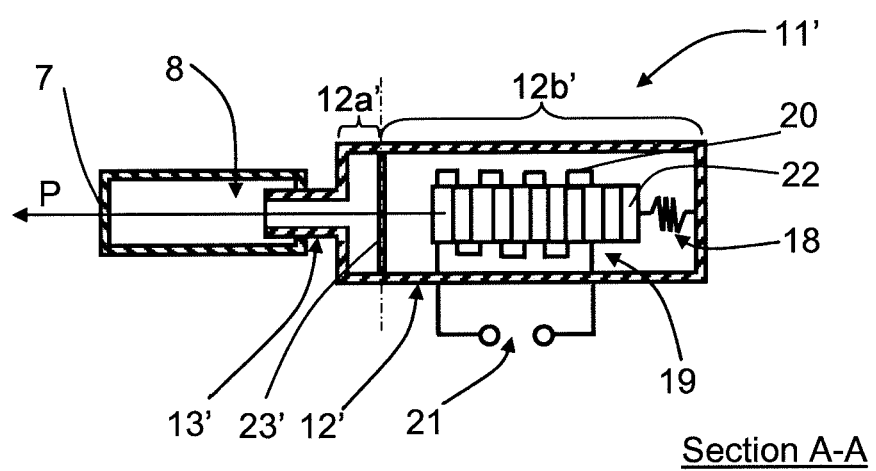
FIG. 5 shows a schematic cross-section view of a second example of a gas pulse device according to the present invention.

With reference to FIG. 5, an alternative gas pulse device 11' is disclosed. The alternative gas pulse device 11' comprises a main enclosure 12' and a transitional enclosure 13', where the transitional enclosure 13' connects the main enclosure 12' to the tubular enclosure 7 in an air-tight manner as in the previous case.

Also, as in the previous case, the main enclosure 12' comprises a membrane 23', dividing the main enclosure 12' in a first part 12a' and a second part 12b', where the first part 12a' is open into tubular enclosure 7, and where the second part 12b' is sealed from the tubular enclosure 7 by means of a membrane 23'.

The second part 12b' comprises a piezoelectric device 19 with electrical windings 20, the electrical windings 20 being connected to a power source 21; this is only schematically indicated in FIG. 5. The second part 12b' further comprises a piston 22 in the form of a piezoelectric stack which is drivable from a rest position in a direction P towards the membrane 23' by means of an electric drive pulse such that a gas pulse is created in the space 8 in the tubular enclosure 7. A possible malfunction is detected and indicated as in the previous example.

Alternatively, the membrane 23, 23' may be excluded, the first part 12a and the second part 12b need not be hermetically sealed from each other, but a leakage may occur. In any case, the total leakage must be small enough to enable sensing.

The power source 16, 21 is preferably the same that drives the actuation of the pyrotechnical charges that are used inflate airbags of the vehicle, the power being withdrawn from an airbag deployment system where the control unit 10 is comprised. In that case, a sufficient power is acquired for creating the gas pulse disclosed above. Thus an airbag firing pulse, or more general, a safety arrangement firing pulse, may be used as energy source, creating a single pulse of high energy when needed. Normally, one pulse for each diagnose check is sufficient.

Examples of power sources are for example 1.75 A/0.5 ms and 1.2 A/2 ms.

There may be different control units for controlling the airbag deployment and possible hood-raising, and the diagnosis check.

By means of the present invention, the functionality of the sensor device 6 may be ensured, which is of a certain importance since life-saving systems in a vehicle always should be functional, preferably over the vehicle's lifetime.

The present invention is not limited to the examples above, but may vary freely within the scope of the dependent claims. For example, any suitable type of bumper arrangement is of course conceivable. Such an alternative may comprise a metal beam to which the bumper cover and possibly an absorbing material are attached.

With reference to FIG. 3, the sensor device 6 may comprise a further pressure sensor 9' at the second end 7b as well, which arrangement may provide information regarding where on the bumper 4 a pedestrian has been hit, which for example enables control of suitable airbags to be deployed.

Furthermore, the gas pulse device 11, 11' may be arranged to function as a pressure sensor, the pressure in the tubular enclosure affecting the membrane 13, 13', if there is a membrane, and the piston 17, 22 such that en electric current is induced or created, this electric current being detected by detecting means (not shown), possibly arranged at the power source 16, 21. The gas pulse device 11, 11' may be arranged to function as a pressure sensor in co-operation with other pressure sensors 9, 9', or as the only pressure sensor of the sensor device 6.

The tubular enclosure may have a circular or oval cross-section.

When an electromagnetic device is used, the piston 17 is preferably mainly made by soft iron.

The transitional enclosure 13, 13' is shown as having smaller cross-section area than the main enclosure 12, 12'. This is of course due to what is suitable, and only shown as an example. The transitional enclosure 13, 13' and the main enclosure 12, 12' may be two pieces of the same part, and may have the same cross-section area. The transitional enclosure 13, 13' should make good contact to the tubular enclosure 7.

The gas pulse device 11, 11' may also be arranged to create a gas pulse in the other direction, i.e. withdraw gas from the tubular enclosure 7. The piston 17, 22 may thus generally move in a direction along its longitudinal extension, either along the arrow P or against the arrow P.

Any type of gas may be used, for example air.

With the term "pedestrian", all types of more or less un-protected persons that may be hit are referred to, irrespective of how the person in question is travelling. The term pedestrian thus for example also relates to bicyclists, motorcyclists and roller-skaters. Generally, the term "person" is used.

The essence of the present invention is to use a pulse generator that creates a sufficiently strong gas pulse in the tubular enclosure, providing a quick and reliable diagnose check of the sensor device 6.

One synergy effect with the invention is that the previously known systems require at least two sensors, where one is checking that the other is working properly. The invention can replace one sensor with the pulse device.

A further feature to add to the pulse device is a compensator for environmental changes, such as altitude and/or temperature changes, since this will at some degree inevitable cause a leakage that may allow sulfate oxide to enter the sensor arrangement which in turn may lead to corrosion.

If the system is designed not to leak, it may still have impact on the measurement range that the arrangement is designed for. It is known to have venting valves with Gore-Tex, but this is expansive and it allows exchange with the environment, resulting in at least some degree of risk for the system, which is not closed anymore.

One way to solve this would be that upon pressure rise, extra volume is allowed in the pulse device resulting in that pressure in the closed system stays within controlled predetermined ranges. Examples of ways to do this are for example a bellow shape connected to the gas pulse device, and/or simply using the space in the second part of the gas pulse device 12b.

The gas pulse device (11, 11') may be arranged to function as an acceleration sensor.

In the following clauses are described.

1. A vehicle impact sensor device adapted to detect an impact between a vehicle 1 and a person, where the sensor device 6 comprises a tubular enclosure 7 which encloses a gas-filled space 8, the tubular enclosure 7 having a first end 7a and a second end 7b and being arranged to extend along a bumper cover 5, mainly across a vehicle forward direction of movement D, when mounted to a vehicle 1, the sensor device 6 further comprising a pressure sensor 9, 9', 11, 11' arranged to detect pressure characteristics in the the tubular enclosure 7, characterized in that the sensor device 6 also comprises a gas pulse device 11, 11' which is connected to the tubular enclosure 7, the gas pulse device 11, 11' being arranged to insert gas into, or withdraw gas from, the tubular enclosure 7.

2. A vehicle impact sensor device according to clause 1, characterized in that the gas pulse device 11, 11' comprises a main enclosure 12, 12' and a transitional enclosure 13, 13', where the transitional enclosure 13, 13' connects the gas pulse device 11, 11' to the tubular enclosure 7.

3. A vehicle impact sensor device according to clause 2, characterized in that the main enclosure 12, 12' comprises a membrane 23, 23', dividing the main enclosure 12, 12' in a first part 12a, 12a' and a second part 12b, 12b', where the first part 12a, 12a' is connected to the tubular enclosure 7 and where the second part 12a', 12b' is sealed from the tubular enclosure 7, 7' by means of the membrane 23, 23'.

4. A vehicle impact sensor device according to any one of the clauses 1 or 2, characterized in that the gas pulse device 11, 11' comprises a piston 17, 22 which has a longitudinal extension and is drivable from a rest position in a direction along its longitudinal extension such that a gas pulse is created.

5. A vehicle impact sensor device according to clause 4, characterized in that the gas pulse device 11 comprises an electromagnetic device 14 which is arranged to drive the piston 17.

6. A vehicle impact sensor device according to clause 4, characterized in that the gas pulse device 11 comprises a piezoelectric device 19 which is arranged to drive the piston 22, the piston 22 being in the form of a piezoelectric stack.

7. A vehicle impact sensor device according to any one of the previous clauses, characterized in that the sensor device 6 comprises a control unit 10, being in control of a power source 16, 21, the power source being arranged to provide power to the gas pulse device 11, 11' when the insertion or withdrawal of gas is desired.

8. A vehicle impact sensor device according to clause 7, characterized in that the control unit 10 is connected to said pressure sensor 9, 9', 11, 11' and is arranged to determine whether the resulting input from said pressure sensor 9, 9', 11, 11' falls within an expected pressure sensor input range following an insertion or withdrawal of gas by means of the gas pulse device 11, 11'.

9. A vehicle impact sensor device according to any one of the previous clauses, characterized in that at a pressure sensor 9 is positioned at the first end 7a of the tubular enclosure 7.

10. A vehicle impact sensor device according to clause 9, characterized in that a further pressure sensor 9' is positioned at the second end 7b of the tubular enclosure 7.

11. A vehicle impact sensor device according to any one of the previous clauses, characterized in that the gas pulse device 11, 11' is arranged to function as a pressure sensor.

12. A vehicle impact sensor device according to any one of the previous clauses, characterized in that the gas pulse device 11, 11' shares power source with a safety arrangement firing pulse.

13. A vehicle impact sensor device according to any one of the previous clauses, characterized in that the gas pulse device 11, 11' is arranged to function as an acceleration sensor.

14. A gas pulse device according to any one of the previous clauses, characterized in that the gas pulse device 11, 11' comprises means for equalizing the sensor's inner pressure to the environmental conditions, due to temperature changes and sea level effects.

15. A gas pulse device arranged to insert gas into, or withdraw gas from, a tubular enclosure 7 characterized in that the tubular enclosure 7 encloses a gas-filled space 8, has a first end 7a and a second end 7b and is arranged to extend along a bumper cover 5, mainly across a vehicle forward direction of movement D, when mounted to a vehicle 1, a pressure sensor 9, 9', 11, 11' arranged to detect pressure characteristics in the the tubular enclosure 7 being mounted to the tubular enclosure 7, where the gas pulse device 11, 11' and the tubular enclosure 7 are comprised in a vehicle impact sensor device adapted to detect an impact between a vehicle 1 and a person.

The invention claimed is:

1. A vehicle impact sensor device adapted to detect an impact between a vehicle and a person, wherein the sensor device comprises a tubular enclosure which encloses a gas-filled space, the tubular enclosure having a first end and a second end and being arranged to extend along a bumper cover, mainly across a vehicle forward direction of movement, when mounted to a vehicle, the sensor device further comprising a pressure sensor arranged to detect pressure characteristics in the tubular enclosure, wherein the sensor device also comprises a gas pulse device which is connected to the tubular enclosure, the gas pulse device being arranged to insert gas into, or withdraw gas from, the tubular enclosure, wherein the gas pulse device comprises a piston which has a longitudinal extension and is drivable from a rest position in a direction along its longitudinal extension such that a gas pulse is created, and wherein the gas pulse device comprises an electromagnetic device which is arranged to drive the piston.

2. The vehicle impact sensor device according to claim 1, wherein the gas pulse device comprises a main enclosure and a transitional enclosure, and wherein the transitional enclosure connects the gas pulse device to the tubular enclosure.

3. The vehicle impact sensor device according to claim 2, wherein the main enclosure comprises a membrane, dividing the main enclosure in a first part and a second part, wherein the first part is connected to the tubular enclosure and wherein the second part is sealed from the tubular enclosure by means of the membrane.

4. The vehicle impact sensor device according to claim 1, wherein the gas pulse device comprises a piezoelectric device which is arranged to drive the piston, the piston being in the form of a piezoelectric stack.

5. The vehicle impact sensor device according to claim 1, wherein the sensor device comprises a control unit, being in control of a power source, the power source being arranged to provide power to the gas pulse device when the insertion or withdrawal of gas is desired.

6. The vehicle impact sensor device according to claim 5, wherein the control unit is connected to said pressure sensor and is arranged to determine whether the resulting input from said pressure sensor falls within an expected pressure sensor input range following an insertion or withdrawal of gas by means of the gas pulse device.

7. The vehicle impact sensor device according to claim 1, wherein a pressure sensor is positioned at the first end of the tubular enclosure.

8. The vehicle impact sensor device according to claim 7, wherein a further pressure sensor is positioned at the second end of the tubular enclosure.

9. The vehicle impact sensor device according to claim 1, wherein the gas pulse device is arranged to function as a pressure sensor.

10. The vehicle impact sensor device according to claim 1, wherein the gas pulse device shares a power source with a safety arrangement firing pulse.

11. The vehicle impact sensor device according to claim 1, wherein the gas pulse device is arranged to function as an acceleration sensor.

12. The vehicle impact sensor device according to claim 1, wherein the gas pulse device is configured to equalize the sensor's inner pressure to the environmental conditions, due to temperature changes and sea level effects.

13. A gas pulse device arranged to insert gas into, or withdraw gas from, a tubular enclosure, wherein the tubular enclosure encloses a gas-filled space, has a first end and a second end and is arranged to extend along a bumper cover, mainly across a vehicle forward direction of movement (D), when mounted to a vehicle, a pressure sensor arranged to detect pressure characteristics in the the tubular enclosure being mounted to the tubular enclosure, and wherein the gas pulse device and the tubular enclosure are comprised in a vehicle impact sensor device adapted to detect an impact between a vehicle and a person, wherein the gas pulse device comprises a piston which has a longitudinal extension and is drivable from a rest position in a direction along its longitudinal extension such that a gas pulse is created, and wherein the gas pulse device comprises an electromagnetic device which is arranged to drive the piston.

* * * * *